United States Patent [19]

Kinnard

[11] Patent Number: 4,685,787
[45] Date of Patent: Aug. 11, 1987

[54] CAMERA

[76] Inventor: Wolcott Kinnard, 2564 N. 124th St., Apt. 407, Milwaukee, Wis. 53226

[21] Appl. No.: 812,271

[22] Filed: Dec. 23, 1985

[51] Int. Cl.$^4$ .................. G03B 17/50; G03B 35/08; G03B 13/02; G03B 17/38
[52] U.S. Cl. ............................ 354/83; 354/115; 354/219; 354/261; 354/266
[58] Field of Search .................. 354/80, 81, 83–85, 354/114, 115, 116, 219–222, 195.12, 275, 276, 261, 266

[56] References Cited

U.S. PATENT DOCUMENTS

| | | | |
|---|---|---|---|
| 1,678,493 | 7/1928 | Van Albada | 354/219 |
| 2,194,737 | 3/1940 | Cathey | 354/115 |
| 2,385,804 | 10/1945 | Fitz | 354/116 |
| 2,476,576 | 7/1949 | Bachelder | 354/116 |
| 2,873,658 | 2/1959 | Land | 354/83 X |
| 3,045,572 | 7/1962 | Kinnard | 354/115 |
| 3,357,328 | 12/1967 | Kinder et al. | 354/222 |
| 3,377,911 | 4/1968 | Mische et al. | 354/222 |
| 3,446,131 | 5/1969 | Cook et al. | 354/83 X |
| 3,805,281 | 4/1974 | Narita et al. | 354/81 |
| 4,101,916 | 7/1978 | Gottschalk et al. | 354/219 |

FOREIGN PATENT DOCUMENTS

| | | | |
|---|---|---|---|
| 2011816 | 9/1971 | Fed. Rep. of Germany | 354/266 |
| 711601 | 6/1931 | France | 354/115 |

Primary Examiner—Donald A. Griffin

[57] ABSTRACT

The improved camera has a film chamber separable and disposable from the exposure chamber of a camera, with a self contained means for processing material for a diffusion transfer-reversal photographic system, with the material comprising a film negative, a glass plate in a mount, a liquid with activating chemicals in either a pod or incorporated in the negative, and a positive emulsion, either coated on the glass or on a film attached to the glass adhesively during processing. When processed, a slide in a mount results in a minute or so.

The improved camera, over my U.S. Pat. No. 3,045,572 of July 14, 1962 provides a larger image size within the constraints of proper interoccular spacing and lenses of a normal angle of view. The improved camera provides for a unique system of focusing, which automatically corrects the interoccular spacing of the stereo pairs when the distance is set.

Provided is a unique shutter for controlling exposures in a stereoscopic camera. A new method of attaching a camera magnetically to a tripod is provided. The use of two separated buttons to prevent accidental exposures without a lock is provided. Improvements are made in a viewfinder, to give a more clearly defined, illuminated frame, which also gives exposure information, and parallax correction is coupled to the focus system, in a new way.

16 Claims, 12 Drawing Figures

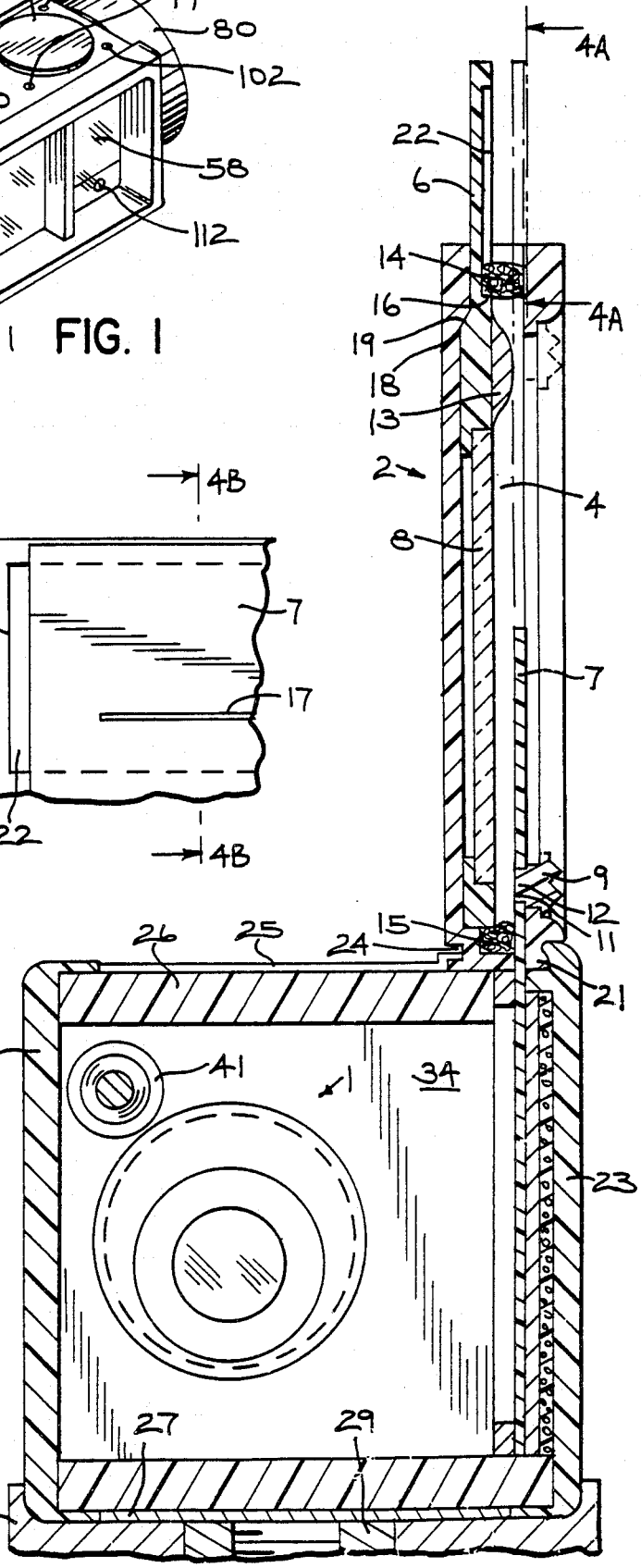
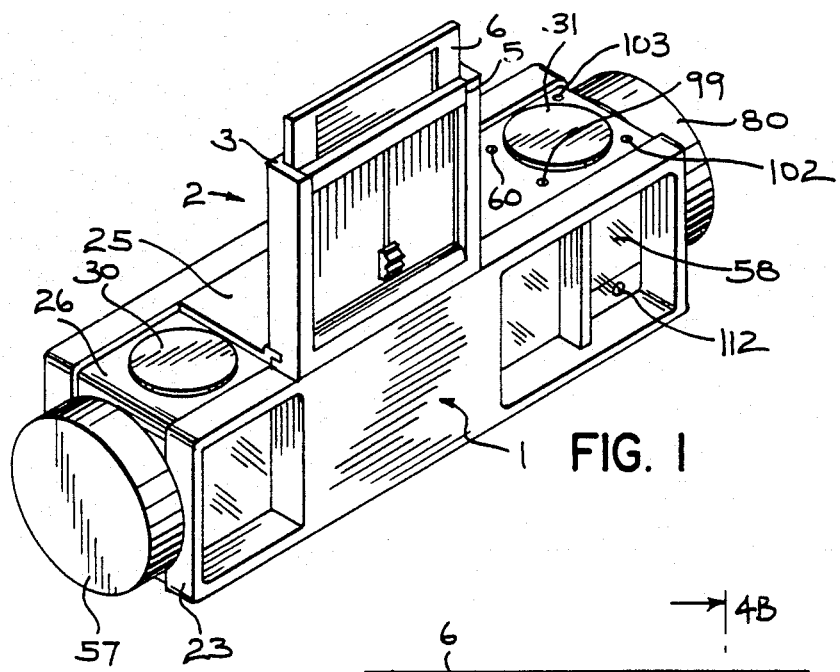
FIG. 1
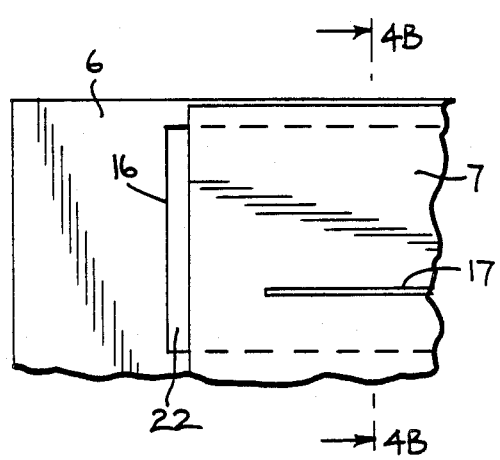
FIG. 4A
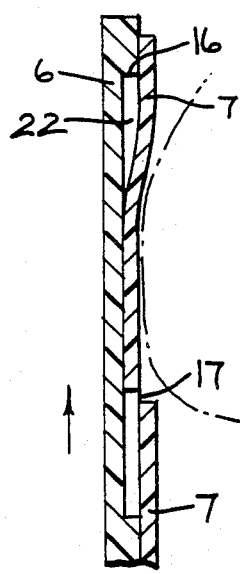
FIG. 4B
FIG. 4

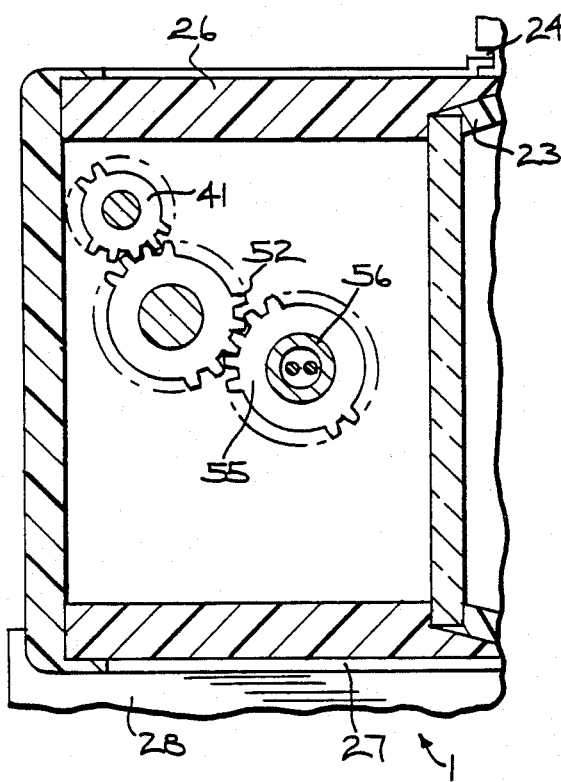
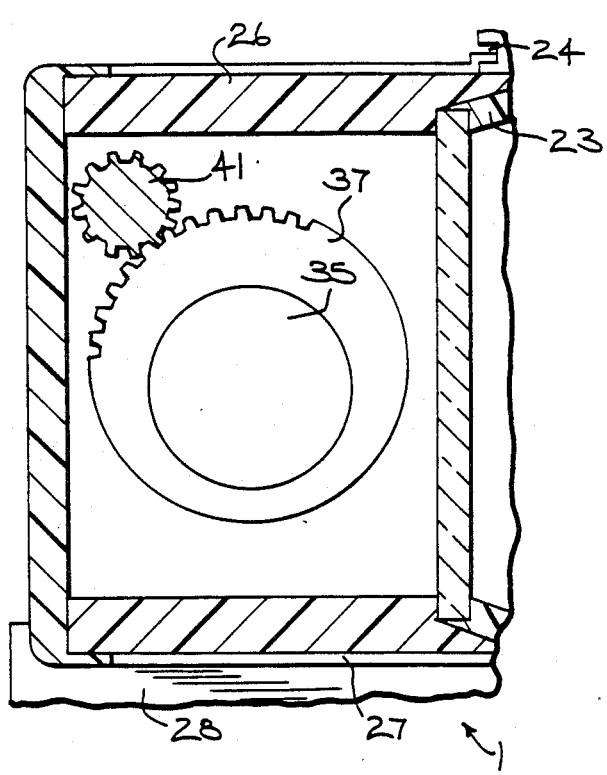
FIG. 5  FIG. 6
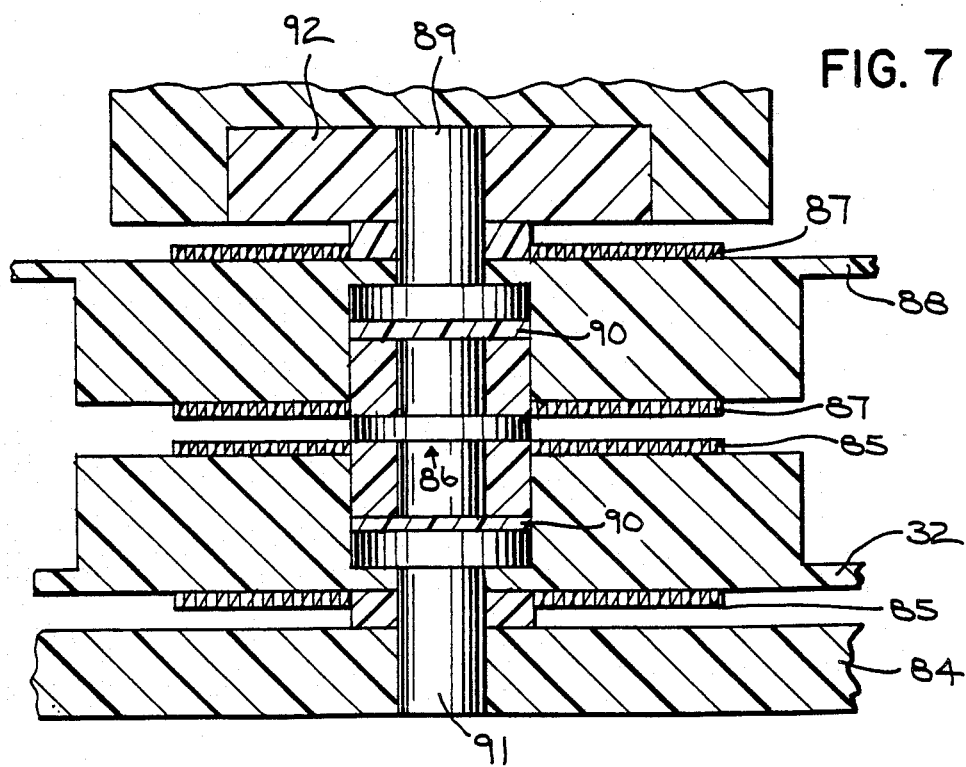
FIG. 7

CAMERA

TECHNICAL FIELD

One aspect of this invention is to provide instant color slides, mounted and ready for viewing, or projection, or automated print making. Another aspect is to provide a viewfinder in which the image is outlined in an illuminated frame with a photo cell control to switch from one colored light to a different colored light to give an indication as to whether the ambient light is satisfactory for an exposure or whether a flash or camera support should be used. Another aspect of this invention is to equip the camera with two separated exposure buttons, so that if either one is pushed it will activate the illuminated frame in the viewfinder, but the second button must be pushed while the first button is held down to activate the shutter. Another aspect of this invention is to provide a means of holding the camera onto a camera support magnetically to prevent the tightening of a tripod screw to cause misalignment of optical elements. Another aspect of this invention is to provide stereoscopic capability through improvements to my U.S. Pat. No. 3,045,572 of July 14, 1962 to automaticlly provide at varying distances, proper interocular location between stereoscopic pairs when focus is set, and a unique shutter to control exposures for the stereoscopic pair. Simplification of camera design holds down the number of parts to less than 100, with a corresponding saving in production costs. The camera is incredibly compact and light weight, despite a reasonable image size of 16×20 mm. for each image of the stereo pair.

BACKGROUND ART

Methods and materials for photographic diffusion-transfer-reversal processes have long been known and are covered in numerous patents, but no provisions have been made for positive mounted slides resulting from processing within a camera, nor have disposable processors been included with a film chamber, which becomes a part of the camera when attached to it. This record includes material which gives basic details and a diagram for Polacolor Film. The Polaroid Corporation has a similar film for 8×10 transparencies. Attached is also a copy of literature from Eastman Kodak Company for a rapid processing slide film in which the liquid for processing is incorporated in one of the film layers, with negative and positive layers joined into a sandwich, with the positive layer stripped away after processing. The Polaroid Corporation also has a 35 mm. slide film which uses an additive process. All of these three transparency systems require a separate processor, and separate die cutting and separate mounting equipment for the 35 mm. versions.

SUMMARY OF THE INVENTION

A primary object of this invention is to provide a camera which gives processed, ready mounted positive slides without special equipment separate from the disposable film chambers which become part of the improved camera when attached to it. These slides can be seen in a stereoscopic viewer, or stereoscopically projected, or used as a recording means for printing conventional two dimensional snapshots, which can also be viewed lifesize in depth in a magnifying stereoscopic viewer. Although this improved camera does take superior stereoscopic photographs, it is only one part of a complete device to reproduce all other aspects of visual perception. Because satisfactory stereoscopic reproduction has been one of the most elusive of the different facets of visual reproduction, the tendancy has been to consider cameras which address the problem as "stereoscopic cameras", as did I in my original patent of 1962. To clarify my concept of a camera that does everything, and in many ways does them better, I am including for the record a paper entitled "Evaluation of a New Camera" which I did not write for this application but which will provide a better understanding of the objectives of this invention. As an example of my previous blindness, in my patent of 1962 I considered that what I had was a stereoscopic camera, not simply a camera with stereoscopic capability. In presenting this to the Eastman Kodak Company, I told their chief camera designer that the 13×17 mm. format of my camera was "the ideal engineering compromise between depth of field and the resolving power of Kodachrome Film, for the sharpest possible picture." I also pointed out, as was obvious as he held it, that my camera was pocket size, without any protruding parts. A few years down the road Kodak introduced their "Pocket Instantmatic" which was similar in size to the camera I showed them, no protruding parts, and the well known 110 size format was exactly the 13×17 mm format I presented to them, in the camera I mistakenly considered only a stereoscopic camera. As further evidence that what I have invented is an improved camera, I am enclosing a sketch of a proposed logo and trademark, calling it "The ALL Camera". Notice that in my evaluation, I consider the competition not stereoscopic cameras, but all cameras for amateur still photography.

The stereoscopic part of this improved camera embodies general optical arrangements of my U.S. Pat. No. 3,045,572. A new focus method is provided in the optical system, which connects by straight line gearing a right hand thread for one lens and a left hand thread for the other lens. Each lens is mounted with a proper amount of eccentricity to correct the image spacing for the distance, when the focus knob, geared to the lenses, is turned. Values for the thread lead, gear ratios, amount of eccentricity, and rotation of the focus knob will be given in the detailed descriptions.

An improved shutter has been provided to operate in unison in the stereoscopic imaging. Two separate opaque shields are in front of each of the two respective lenses, and each opposing pair of shields are attached by a member which pivots at a point centered between the lenses in a rib in the camera exposure chamber. Each member with its shields is free to rotate on its pivot independently of the other member. At the center of, and wound transversely on each connecting member near the pivot point is a wire coil which in conjunction with permanent magnets attached to the rib, makes a separate electric motor of each connecting member. The electronic circuit in the camera acts as follows: On pressing two separate exposure contacts, one connecting member is activated just enough to rotate so that its shields uncover the lenses, and with the shields of the second connecting member previously clear of the light paths the start of an exposure is made. A conventional photo electric sensor operates a conventional timing circuit which activates the second connecting member to rotate and bring its shields in front of the lenses at an interval timed by the amount of light in the scene, terminating the exposure. The polarity of the current is then reversed, so that the operation is reversed for the next exposure and so on.

A further aspect of this invention has been to provide a larger image size than that of my older stereoscopic camera This increase is essential because of present limitations in resolution in transfer-diffusion-reversal photographic technology. In my previous invention which used roll film it was only practical to use a generally available film, and this was 35 mm. wide, with sprocket holes on one side. This limited the image in each of a stereo pair to 13 mm. wide. Using the transfer-diffusion reversal process in the present camera, the limitation on image size is for the optics and image to fit within the interoccular separation of average eyesight, 2½ inches. With the older camera, even with the smaller image size, the design required an increase beyond an ideal interoccular separation, which gave a somewhat exaggerated stereoscopic effect. In the new camera, the problem is solved by moving the film plane forward 0.230 inches from the front edge of the mirrors to allow room for the four element 26 mm. lenses (which give the normal angle of view so necessary in stereo photography) and allow proper lens to image distance for proper focus. The distance from the front edges of the outside mirrors to the film plane allows cover glasses to be sunk back from the foremost plane of the camera, providing sunshades and protection against handling, and retaining a flat profile for the front. This arrangement, with the focal length of the lenses, the film and image sizes, and the optical dimmensions are close to ideal and any deviation from them would require compromises in optimum design.

Camera viewfinders which show a reflected image to frame an object have been common. Although capable of accurately locating an image, under some light conditions the frame is difficult to see. To overcome this problem, the rear of the finder next to the eye, has an electrically powered edge lit groove defining the frame in a transparent plate. This is illuminated by red and green light-emmitting diodes to boost the reflected image of the frame. A spirit level is illuminated by the diodes, either above or below the transparent plate. In the electronics of the camera a conventional sensor determines whether there is enough ambient light to take the photograph, in which case the green diode illuminates the frame. If not, the red diode illuminates the frame to indicate that supplementary light such as flash, or a camera stand should be used. At the instant an exposure is made both diodes light together momentarily to flash illuminate the frame, to give an indication in case the shutter action is inaudible. A pinion gear in the stereoscopic focusing arrangement is threaded on the finder end, and moves the transparent plate according to the rotation for focusing the camera lenses, providing automatic parallex correction for the finder.

Another aspect of the improved camera is a means of holding it onto a camera support. In addition to the fact that there is not enough room for a standard tripod screw, such a screw if tightened to the camera would be likely to destroy the optical alignment of the elements, critical in stereoscopic photography. The solution in this invention is to provide a steel or iron plate on the bottom of the camera, which will hold the camera magnetically to a magnet attached to or part of a camera support.

Another aspect of this invention is that two exposure contacts are provided, one at the top of each end of the camera. This is a safety means to prevent accidental exposures without a lock. Either contact is activated by a finger of one hand, and the exposure is made by closing the other contact with a finger of the other hand.

A snap-on, rather than a built-in flash is provided for three reasons: one, a built-in flash would be so close to the lenses that red eyes would be inevitable; two the lighting would be wrong in coming directly from the side of objects; and third, with the ever increasing speed of emulsions, flash would often be unnecessary, and a built-in flash would cancel some of the compactness and lightweight advantages of this camera.

An electronic flash unit of conventional design is provided with pins which have snap fits into contact holes in the camera, which both hold it onto the camera and provide the necessary electrical connections. The only reasonable place on the camera for the flash is vertically above the finder. At this position the flash covers one exposure contact. While the flash is connected, a contact on the flash replaces the covered one, and electrical connections in the snap-on pins are provided for this. The flash unit is the same size as the camera, with the connecting pins included in the length. This provides for compact storage in a case. Whenever it is attached to the camera, the flash is automatically controlled to give approximately 25 percent of the ambient light, unless this light is insufficient for an exposure, in which case the flash will provide all of the light according to the distance setting on the camera. In other words, if the flash is attached, the amount of light can be ignored; if there is sufficient ambient light, the flash will give additional illumination in any shadows without washing them out; if there is sufficient ambient light, the flash will give necessary power.

BRIEF DESCRIPTION OF DRAWINGS

FIG. 1 is an isometric view of the the camera, showing the front, top, and left side.

FIG. 4, shows the camera with film chamber, exposure chamber, and magnet for tripod attachment.

FIG. 4A is a partial view of FIG. 4 showing the negative and end of the slide mount where they extend out of the film chamber, to allow grasping and pulling for processing.

FIG. 4B is a sectional view of FIG. 4A.

FIG. 5 is a sectional view of FIG. 2, showing the drive gear, idler gear, and pinion, in relation to the camera body.

FIG. 6 is a sectional view of FIG. 2, showing the pinion, lens gear, and eccentricity in the lens mount.

FIG. 7 is a greatly enlarged sectional view of a portion of the shutter.

DETAILED DESCRIPTION OF THE PREFERRED EMBODIMENTS

Although the disclosure hereof is detailed to enable those skilled in the art to practice the invention, the physical embodiments herein disclosed merely exemplify the invention, which may be embodied in other specific structure. While the best known embodiment has been described, the details may be changed without departing from the invention, which is defined by the claims. Referred to my U.S. Pat. No. 3,045,572 of July 14, 1962, which is incorpporated by referrence.

Figure 9:
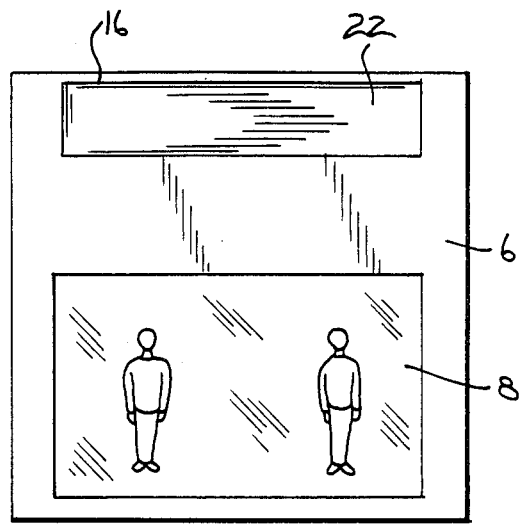
FIG. 9 shows the slide mount and slide.

Referring first to FIG. 1 is a camera comprising an exposure chamber 1, and a film chamber 2. The film chamber 2 comprises a film chamber back 3 and a film chamber front 4, which, cemented or otherwise joined together at 5, form it to hold slide assembly 6, and negative film 7. In FIGS. 4 and 9, slide mount assembly 6 is shown to have an opening with glass plate 8 seated in a recess in it, where it is joined by adhesives. The surface of glass plate 8 on which is coated the positive photographic emulsion for a diffusion-transfer-reversal process, is flush with the surface of slide mount assembly 6. In FIG. 1, negative film 7 can be brought into exposure chamber 1 with slider 9 moving in slot 10. In FIG. 4, slider 9 is shown attached to negative film 7 by a rectangular hole 12 in negative film 7 with a force-fit boss 11 molded into the rear side of slider 9, with boss 11 long enough to go through hole 12, holding negative film 7 next to the inside front of film chamber 2, yet allowing slider 9 to move negative film 7 freely into exposure chamber 1. Negative film 7 is of a type used for diffusion-transfer reversal photography in one of the forms known to the art. For use in the preferred version, the base of negative film 7 should be black and opaque and rigid enough to permit the film to be pushed into place in exposure chamber 2 without additional support. A satisfactory thickness for negative film 7 is 0.010 inches on a polyester base. In this preferred version a pod 13 containing requisite liquid chemicals is attached in slide mount assembly 6.

Film chamber front 4, film chamber back 3 and slide mount 6 are molded in a rigid black plastic as the preferred material. The black is not shown in the drawings for purposes of clarity. Slider 9 is molded in plastic of a contrasting color. Along the bottom of film chamber 2 is a molded lip which has a thickened edge 21 along the bottom of the lip. This edge fits in depression 22 in front 23 of exposure chamber 1. In film chamber back 3, just above the bottom, is groove 24. To attach film chamber 2 to exposure chamber 1, groove 24 is engaged by entering it into the raised edge of spring clip 25 which is attached to exposure chamber body 26. Film chamber 2 is then tipped slightly forward so that front 23 spring out enough to allow thickened edge 21 to snap into depression 22 in front 23. This holds film chamber 2 upright to exposure chamber 1. To position negative film 7 ready for an exposure, slider 9 is pushed down to the bottom of slot 10. After an exposure, or if it is desired to save the film for another time, negative film 7 can be returned to film chamber 2 by bringing slider 9 upward and an exposed photograph is ready for processing. The processing can be done while film chamber 2 is attached to exposure chamber 1, or it can be unattached and processed within any reasonable time. If an exposure has not been made, the film chamber can be removed for later use. The unjoining is accomplished by reversing the joining process.

Processing is accomplished by squeezing together, with fingers, and end of slide mount assembly 6 and negative film 7 at the top where they extend out of film chamber 2, and pulling them out together. To facilitate this, a sharp edge 16 is formed by depression 22 molded in slide mount assembly 6 and a slit or slot 17 in negative film 7. In FIGS. 4A and 4B, edge 16 and edge 17 then engage as negative film 7 and slide mount assembly 6 are squeezed and pulled out together. When this is done, angled step 18 in film chamber back 3 causes an angled step 19 in slide assembly 6 to bring them into contact under pressure, breaking the pod 13 and spreading the chemicals between negative and positive, through a squeege action at 20. A flexible, absorbant, opaque, black material such as felt forms light trap 14, which not only prevents light leaks, but wipes off excess fluid. A similar light trap 15 is at the other end of exposure chamber 2. When the negative and positive are pulled out together, slider 9 is forced out of slot 10 to be discarded.

Another version of the diffusion-transfer-reversal process is for the film base to face toward the image, and the exposure is made through the base, which is transparent. The positive emulsion is affixed to the negative. The processing fluid is incorporated in the negative emulsion and a pod is not used. When pressure is applied to this sandwich, the liquid goes through the negative layers to the positive. In this system the positive layer and slide mount 6 must still be next to the emulsion side of the film and the slide mount must be on the opposite side of film chamber 2, which puts it toward the front of the camera. Since the slide mount cannot be entered into exposure chamber 1, the slide mount must be joined adhesively to the sandwich with the pressure applied in processing. In either process, after the requisite time, negative 7 and pod 13 (if used) is peeled away from slide mount 6 and discarded, leaving a positive image on glass, in a mount. Small conventional, yet disposeable, rollers could be substitute for the angled steps to provide roller pressure instead of squeege pressure, if desired. Although film chamber 2 could conceivably be reloaded with new negative film, a new slide mount assembly, and a new slider, the chamber is designed to be so low cost that it is intended to be disposeable.

Figure 2:
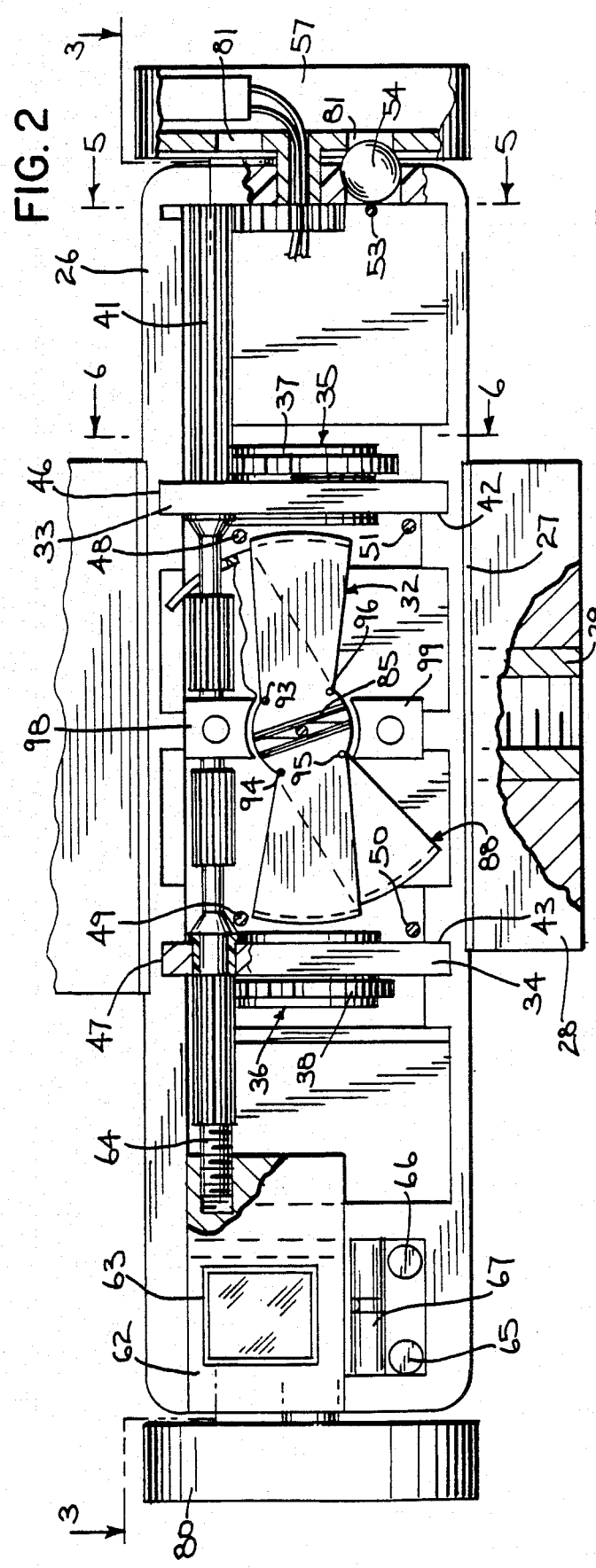
FIG. 2 is a back view of the exposure chamber, view finder, exposure control, shutter, and magnet for holding the camera onto a tripod.

Attached to the bottom of the camera as shown in FIGS. 2 and 4 is a steel or iron plate 27. Magnet 28 has insert 29 with a hole threaded to receive a standard tripod screw, which can thus be afixed to a tripod or camera stand. Steel plate 27 can then hold the camera to it magnetically. The camera can be instantly removed by pulling on it to break the magnetic attraction.

Figure 10:
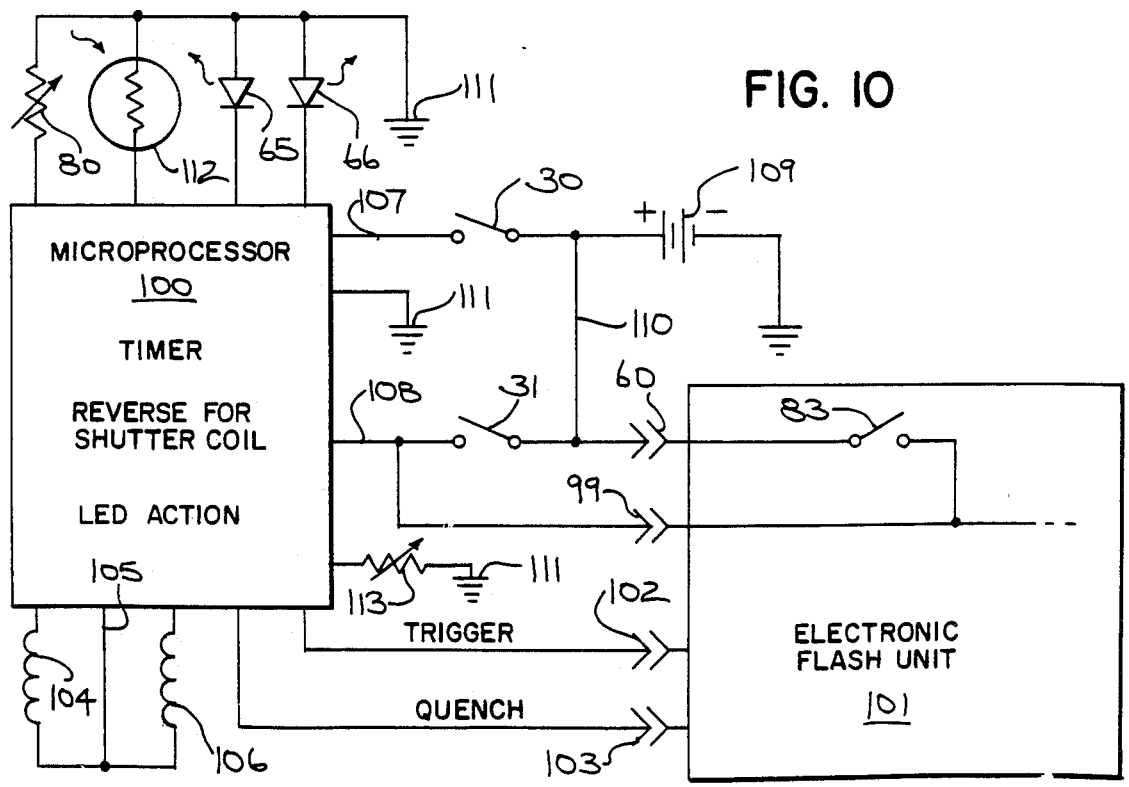
FIG. 10 is a diagram of the electical and electronic elements of the camera and its flash connections.

In FIG. 1, two exposure buttons 30 and 31 are operatively connected to electrical switches 30 and associated circuitry shown in 31 FIG. 10. Both switches must be closed for shut 32, FIG. 2, to operate and a photographic exposure be made.

Figure 3:
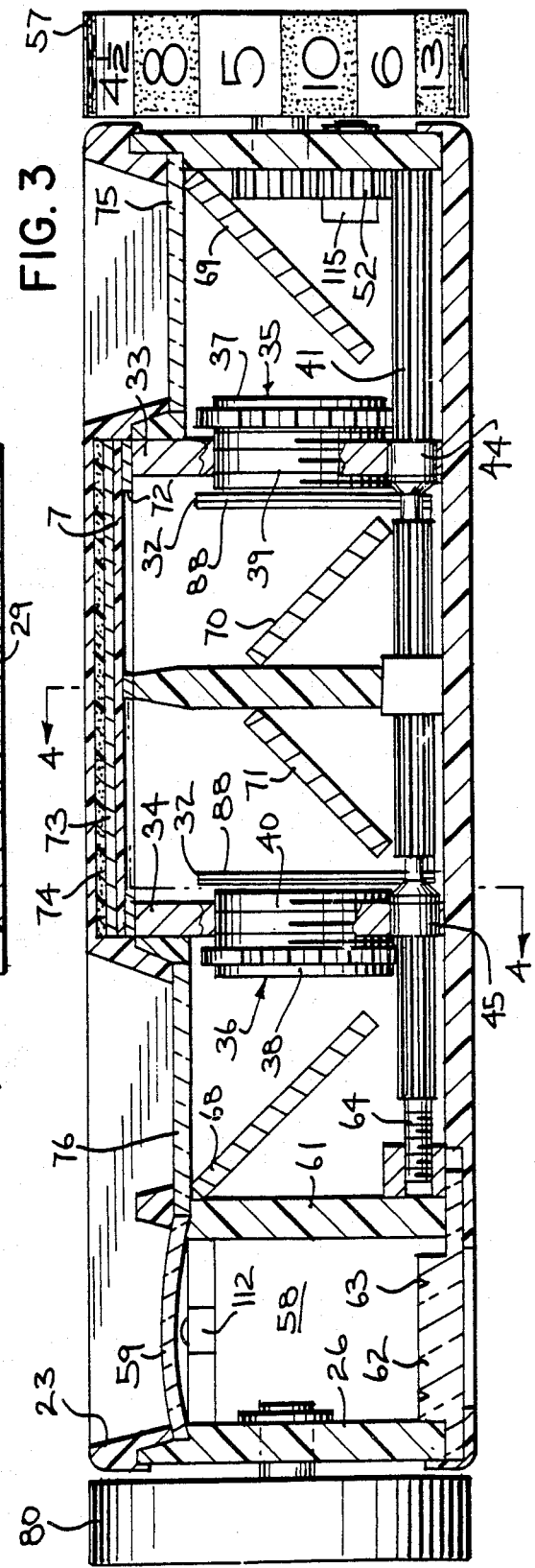
FIG. 3 is a sectional view of the exposure chamber, mirrors, focusing details, view finder, film in position for exposure, lenses, focus control, exposure control and cover glasses.

FIG. 1 shows camera finder 58 and in detail in enlarged sectional view in FIGS. 2 and 3. Finder lens 59 is seated between camera body 26 and camera front 23. The rear surface of finder lens 59 has a negative curvature, with a semi-reflective coating of about 40 percent transmission. The negative curvature is for −7 diopeters so that a frame or an object at the rear of the finder is reflected back from the semi-reflective surface, in focus for the camera user's eye. Front surface curvature of finder lens 59 determines the image size seen in the finder. A positive curvature equal to the inside negative curvature of finder lens 59 gives a full size image. If a smaller and perhaps more comfortable to view image is desired, a flatter positive curvature is required. Transparent plate 62 at the rear of finder 58 has a frame 63 etched or cut in the inside surface, of a size that the image reflected from this frame by front lens 59, back to the eye, will match the images projected onto the film by the camera. By moving transparent plate 62 laterally, the position of the image in the finder is changed and this is used to provide a correction for parallax error. The 5–20 thread 64 on the end of pinion 41 is a double thread to give a lead of 20 turns per inch when threaded into the finder frame assembly, providing for an approximate correction with the amount of turning of pinion 41 for the focus range of the camera. Light from the scene that enters the finder illuminates frame 63 in the transparent plate. To augument this, additional illumination is provided by a red light-emmitting diode 65 and a green light-emmitting diode 66 as shown in FIGS. 2 and 10. Either diode gives additional illumination by an edge lighting effect on the cut or etched frame 63 in transparent plate 62. Instead of edge lighting the frame, the diodes can be moved forward, as an alternative, to give reflective illumination of frame 63. Between diodes 65 and 66 and transparent plate 62 is spirit level 67 which is illuminated by either diode. An image of spirit level 67 is reflected back from finder lens 59 to the eye.

Referred to my U.S. Pat. No. 304,557 of July 14, 1962 which is incorporated by reference, FIG. 3 is an enlarged sectional view of exposure chamber 1, showing the positions of mirrors 68, 69, 70, and 71. It also shows negative film 7 in position for an exposure, aperture plate 72, and pressure plate 73 which holds the film flat with pressure from foam rubber 74.

Pinion shaft 41 with plastic bearings 44 and 45, lens plates 33 and 34 and lens mounts 37 and 38 fit together and the lens plates fit into slots 42, 43, 46, and 47 in camera body 26. In this position pinion 41 meshes with lens mount gears 37 and 38 and with idler gear 52. Lens mounts 37 and 38 have 58 teeth and are 96 pitch, 20½ degree pressure angle. Pinion 41 has 14 teeth, idler gear 52 has 25 teeth, and drive gear 55 has 25 teeth. FIG. 5, a section of FIG. 2, shows the relationship between drive gear 56, idler 51, and pinion 41. FIG. 6, a section of FIG. 2, shows the relationship between pinion 41 and lens mount gears 37 and 38. With the gears in the train, one turn of focus knob 57, which is attached to drive gear 55 with a keyed shaft 56 through a hole in the end of camera body 26, rotates lens mounts 37 and 38 a total of 72 degrees.

Figure 8:
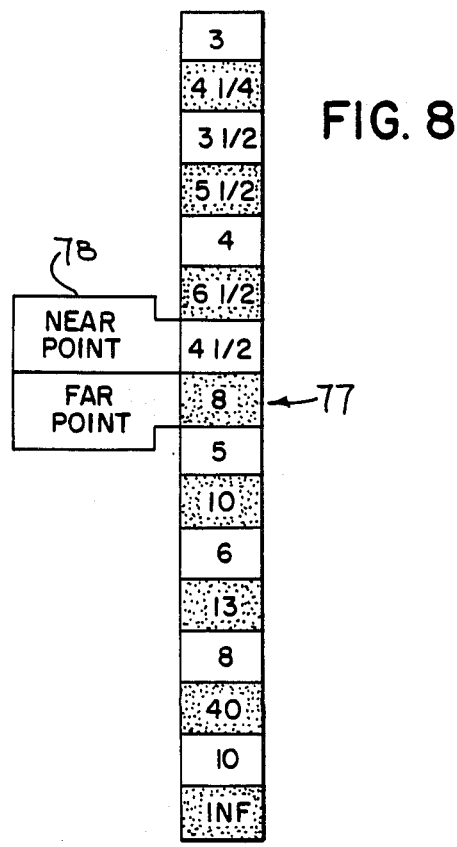
FIG. 8. shows the focus distance markings for the shutter control knob and their reference markings.

Lens mounts have shallow, special threads 39 and 40 with a 12 per inch lead, with the threads of lens mount 39 right handed and of lens mount 40 left handed, with corresponding threads for respective lens plates 33 and 34. The threads, with the 72 degrees of rotation, focus from 3½ feet to a 20 foot hyperfocal distance which covers infinity. Lenses 35 and 36 are 26 mm. focal length, in matched pairs for each camera, internally stopped down to a fixed f 5.6, and are glass four element Tessar type, cemented in the lens mounts after being optically focused to the distance scale. The holes in lens mounts 37 and 38 are molded 0.022 inches off center. The eccentricity moves the lenses 0.017 inches laterally when oriented with the gearing and threads to automatically correct the interoccular spacing of the stereoscopic pairs to the focus distance. Focus knob 57 is marked on its parimeter with distance strip 77, FIG. 8. Reference markings 78 are on back 79 next to focus knob 57. Exposure knob 80 contains potentiometer 80 FIG. 10, with reference markings on exposure knob 80 and back 79, FIG. 2.

In FIG. 2, straight spring wire 53 is inserted in holes in case 26 to hold ball 54 against hole 81 to provide a click position for focus knob 57. A series of such holes are provided around the center of the inner side of focus knob 57 to provide click positions for distance markings 77. Eight such holes are provided, equally spaced around 360 degrees, which gives numbers of good legibility.

FIG. 3 shows cover glasses 75 and 76 held seated in place between front 23 and camera body 26. The film plane at aperture plate 72 is forward 0.230 inches from the plane of the front edges of mirrors 68 and 69 giving maximum image size with normal angle of view lenses within the constraints of inter-occular spacing of 2½ inches of normal eyesight. The areas around finder 58 and cover glasses 75 and 76 have been extended to the formost plane of front 23, which form sunshades and give protection to finder lens 59 and cover glasses 75 and 76 and retain a flat profile for camera front 23.

The camera shutters are shown in FIGS. 2, 3, and 7. Shutter member 32 has opaque shields at right angles to each end to cover and uncover the light through lenses 35 and 36 as shutter member 32 rotates on pivot 91, FIG. 7. Pivot 91 is conductive and carries electrical current from one end of coil 85 through conductive plate 84 which is cemented to rare earth permanant magnets 98 and 99 which are cemented to the rib in camera body 26, with the pivot point centered between lenses 35 and 36. Conductive plate 84, of non-magnetic material such as brass, is electrically connected to timing circuit 100, FIG. 10. The other end of coil 85 is electrically connected to terminal 104 (FIG. 7) by conductive pivot 86 which shares electrical polarity with one end of coil 87 of second shutter member 88. Second shutter member 88 is inside shutter member 32, with clearance so both can rotate freely independently of each other. Conductive pivot 89, for second shutter member 88, is electrically connected to the other end of coil 87, and turns in conductive bearing 92 which is seated in a rib in camera body 26. Conductive bearing 92 is electrically connected to terminal 105 (FIG. 7). Until the coils are energized, bits of ferric material, 93, 94, 95, and 96, are attached to the shutter members where they are stopped and held by permenant magnets 97 and 98 at the end of rotation. When a coil is energized, the stronger magnetic attraction of the energized coil breaks the attraction of a ferric bit to allow the shutter member to rotate. When the electrical shutter is activated by closing exposure switches 30 and 31, the coil of one shutter member, whose shields cover the light from lenses 35 and 36, is energized and attraction from magnets 97 and 98 causes the shutter member to rotate until its shields are clear of the light paths. After one shutter member rotates to an open position, circuit 100 FIG. 10 turns off the power to that coil. Then, at an interval determined by timing circuit 100 FIG. 10, power is supplied to the second shutter member to cause it to rotate in the same direction as the first shutter member. The second shutter member rotates to bring its shields from an open to a closed position, terminating the exposure. When one exposure cycle is completed the circuit of 100 FIG. 10 reverses the polarities for the next exposure and so on. Shields of both shutter members are slotted to clear pinion 41. Conductive pivots 86, 89, and 91 are separated by electrically insulating spacers 90, (FIG. 7) as shown in FIG. 7.

Screws 48, 49, 50, and 51 extend from front 23 to back 79 where nuts tie them to camera body 26.

FIG. 10, fitting 60 connects the camera mechanically and electrically to electronic flash unit 101, where switch 83 replaces the function of switch 31, FIG. 1, which is covered when electronic flash unit 101 is attached. Fitting 99 (FIGS. 1 and 10) connects the camera mechanically and electrically to flash unit 101 and furnishes return current from switch 83 to microprocessor 100, and also carries current from microprocessor 100 to the trigger circuit in electronic flash 101. Fitting 102 (FIG. 10) connects the microprocessor to trigger electronic flash 101. Fitting 103 (FIG. 10) connects the camera electronically and mechanically to electronic flash unit 101, and connects the control circuit in microprocessor 100 to the light outout circuit of electronic flash 101. Leads 104, 105, and 106 (FIG. 10) carry the appropriate current from microprocessor 100 to shutter coils 85 and 87, FIGS. 2, and 10. Leads 107 and 108 (FIG. 10) connect microprocessor 100 to contacts 30 and 31. The positive side of battery 109 is connected to contacts 30 and 31, through lead 110 (FIG. 10). The negative side of battery 109 is connected to ground 111. Battery 109 is located inside of focus knob 57. Photocell 112, which is a variable resistor from light falling on it, is connected to microprocessor 100 and ground 111 (FIG. 10). Exposure control 80, FIGS. 1 and 10, is a variable resistance and is connected to microprocessor 100 and ground 111. Red light diode 65 is connected to miscroprocessor 100 and ground 111. Green light emmitting diode 66 is connected to microprocessor 100 and ground 111. Fitting 102 (FIG. 1) connects the camera mechanically and electrically to electronic flash unit 101, and together with common lead 99, completes the trigger circuit from microprocessor 100. Microprocessor 100 is programmed or set up to function as follows: closing any one of contacts 30, 31 or 83 determines whether red light emmitting diode 65, or green light emmitting diode 66 is illuminated and powers the proper one. It also sets a time delay between shutter coils 104 and 106. If red diode 65 is illuminated, it sets the time delay to give an exposure of 1/50th second, providing electronic flash 101 is plugged in. If electronic flash 101 is connected, the power is determined by a variable resistance operatively connected to idler gear 52, again providing the power is to red diode 65. If green diode 66 is illuminated, and if electronic flash 101 is connected, power is regulated to give 25% of the ambient light exposure, and a time delay is set to give exposure for the ambient light. Upon closing one of the two remaining contacts of 30, 31, Or 83, power is supplied to the closed shutter coil, discontinued at the end of rotation, and according to the time delay, power is then supplied to the coil of the open shutter members, and at the end of this rotation, power is discontinued, and polarity is reversed to both coils for the next exposure.

I claim:

1. A camera comprising a first chamber and a second chamber with means to attach and detach said first chamber and said second chamber from each other, with said first chamber comprising means to make a photographic exposure on sensitized film, and said second chamber containing a film sensitized to produce a negative in a diffusion-transfer-reversal photographic process and containing a slide mount with a transparent base therein, with a positive image receiving surface for said diffusion-transfer-reversal process, which can be adhered to said transparent base, and with a means to spread under pressure the requisite liquid chemicals for said diffusion-transfer-reversal process, a means to transport said film sensitized to produce a negative image into said first chamber, a means to withdraw said film back into said second chamber, a means to withdraw from said second chamber said film sensitized to produce a negative image together with said slide mount and said positive image receiving surface, and with a means to apply pressure by said withdrawal to spread said requisite liquid chamicals between said film sensitized to produce a negative image and said positive receiving image on said transparent base and said slide mount, thus effecting completion within a requisite time period of said diffusion-transfer-reversal process.

2. In a camera for impressing stereoscopic pairs of photographic images upon a member having a rearwardly directed plane surface to hold a sensitized film, the combination with a chamber within which said surface is disposed, of separate spaced optical systems for receiving light from in front of said camera at opposite sides of said surface and directing the received light inwardly thence forwardly against said surface, each of said systems comprising a plurality of mirrors, and lenses behind said sensitized surface and disposed between mirrors on axes generally parallel to said surface and each comprising means for focusing upon said surface the light directed from one mirror to another in the respective systems, wherin the improvement comprises said means of focusing with tubular mounts for each of the two lenses, each of the two said tubular mounts having male screw threads parallel to the axis of each lens, with the screw thread for one lens left-handed and for the other right-handed, said screw threads mating with female screw threads contained in members laterally positioned to the axes of said lenses, and attached to said chamber, with means to connect the two lens mounts to rotate in unison, which brings the lenses equidistant from said surface, said distance determined by the amount of rotation of said lens mounts and the lead of said screw threads.

3. In the camera of claim 2, said female screw threads contained in members laterally positioned to the axis of said lenses, and attached to said chamber and with a geared shaft connecting said female threaded members, and rotating in bearings in said members, said geared shaft mating with gears attached to or part of the circumference of said lens mount and a means of rotating said geared shaft to set the focus distance of said two lenses according to a distance scale.

4. In the camera of claim 3, a gear train mated to said geared shaft, with the last gear in said train attached to a knob, on which is a calibrated distance scale, in which one or less revolutions of said knob rotates, by the gears in said train, the tubular lens mounts for the amount necessary for the focus range desired in said camera.

5. In the camera of claim 3, a viewfinder with a front lens with a semi-reflective rear coating which reflects back to an observer's eye to the rear of said viewfinder the image of a reflective frame in the rear of said viewfinder, said frame being operatively connected to a screw threaded member which mates with a screw thread of said viewfinder end of the geared shaft, said frame moving along the axis of said geared shaft, with the lead of said screw threads chosen to give an approximate parallax correction as said frame moves axially to and with the rotation of said geared shaft.

6. In the camera of claim 2, the optical elements of each lens offset from the axis of said tubular lens mounts to move laterally, on rotation, in unison, said optical elements moving laterally the distance necessary to substantially correct the image spacing between stereoscopic pairs according to the focus distance range desired in said camera, with the amount of eccentricity and the amount of rotation determined by the lateral movement required, and the lead of said screw threads for said focus distance range is then determined by the aforesaid amount of rotation.

7. In the camera of claim 2, wherein the improvement comprises limiting the distance between the outer light paths equal to the approximate average interoccular distance of human eyesight, then reflected laterally by mirrors toward each other and thence through lenses focusing with a normal angle of view, passing the received light inwardly and thence it is directed forwardly by reflection of other mirrors to said sensitized surface, with the width of said surface, and the angle of view of said lenses to give maximum width images within the constraints of the light paths thus formed.

8. In the camera of claim 7, the forward edges of said mirrors limited to the light paths of the images, with the distance between said forward edges of said sensitized surface plus its backing, formed to frame said light paths to the plane of said backing, giving said camera a flat profile except for said light path openings.

9. In the camera of claim 2, means for controlling the movement of light to said surface for limiting exposure, wherein the improvement comprises two opaque shields in front of or behind a lens for each shield, said shields attached to a connecting member pivoting centrally between said shields and located in a bearing in a cross member traverse to the axis of said lenses with at least one magnet held to said cross member and proximate to a coil of non-ferrous electrically conducting material wound transversely to and on said connecting member, with all elements except said shields clear of said light paths of said camera, with means of passing an electrical current through said coil, causing said connecting member to rotate by electro-magnetism until said shields are clear of said light paths, and means to reverse the polarity of said electrical current at a timed interval, causing said shields to reverse direction and again block out light from said light paths, terminating a photographic exposure.

10. In the camera of claim 2, wherein the improvement comprises means for controlling the movement of light to said surface for limiting exposure, said means comprising two opaque shields in front of or behind a lens for each shield, with said shields attached to a connecting member, and a second set of shields, with a connecting member, nested inside the first set, with each set free to rotate independently of the other, with both of said connecting members pivoting centrally between said shields with said pivots located in a bearing in a cross member traverse to the axis of said lenses with at least one magnet held to said cross member and proximate to a coil of non-ferrous electrically conducting material wound transversely to and on each of said connecting members with all the elements, except one set of shields on one connecting member, clear of said light paths of said camera, with means of passing an electrical current through the coil of said connecting member whose shields cover said light paths, causing said connecting member to rotate until its said shields are clear of said light paths, with means to discontinue said electrical current when said light paths are thus cleared, and means at a timed interval to pass an electrical current through the coil of the second said connecting member, causing it to rotate and its shields to block said light paths thus terminating an exposure according to said timed interval, and a means to reverse the polarity of said electrical current at the end of each exposure sequence.

11. In the camera of claim 9 or 10 a connecting member or members which rotate on a pivot in a field between a stationary permanent magnet and an electrically magnetized coil in said member, a means of holding said connecting member in place against said permanent magnet at the end of rotation and when electrical current to said coil is discontinued, in which a bit of ferric material attached to and a part of said connecting member, holds said connecting member in place by magnetic attraction, with said ferric bit large enough to hold said connecting member in place, and small enough for an electrically energized coil to overcome the magnetic attraction of said ferric bit.

12. In the camera of claim 2, a flat surface on the bottom made of ferric material which will hold said coamera by magnetic attraction to a magnet attached to or part of a camera support.

13. In a camera, two normally open electrical switches accessible to the outside of said camera in which pressure on either of said switches closes the electrical connection of that switch and release of said pressure opens the electrical connection, and the closing of either of said switches activates any desired electrical functions excluding a shutter or shutters, and where with the one switch held closed, the closing of the second switch activates said shutter or shutters to effect a photographic exposure.

14. A camera incorporating a viewfinder with a front lens with a semi-reflecting coating on one surface of said front lens which reflects back to an observer's eye behind said viewfinder the image of a spirit level, with said spirit level illuminated by an electrically powered light source or sources.

15. A camera incorporating a viewfinder with a front lens which has a semi-reflective coating on a surface of said front lens which reflects back to an observer's eye behind said viewfinder the image of a frame in the rear of said viewfinder illuminated by either or both of at least two light sources of contrasting colors powered by electricity in which said light sources are selectively activated by sensors so that each color indicates a different level of illumination available to make a photographic exposure.

16. In the camera of claim 15, in which said view finder frame is depressed in a transparent plate with the outline of said depressed frame illuminated through the edges of said transparent plate by at least one electrically powered light source.

* * * * *